US009658664B2

(12) United States Patent
Bernon-Enjalbert et al.

(10) Patent No.: US 9,658,664 B2
(45) Date of Patent: May 23, 2017

(54) ELECTRONIC DEVICE HAVING A PIN FOR SETTING ITS MODE OF OPERATION AND METHOD TO SET A MODE OF OPERATION FOR AN ELECTRONIC DEVICE HAVING A PIN

(75) Inventors: Valerie Bernon-Enjalbert, Fonsorbes (FR); Philippe Mounier, Tournefeuille (FR); Franck Galtie, Plaisance du Touch (FR)

(73) Assignee: NXP USA, Inc., Austin, TX (US)

( * ) Notice: Subject to any disclaimer, the term of this patent is extended or adjusted under 35 U.S.C. 154(b) by 162 days.

(21) Appl. No.: 14/395,730

(22) PCT Filed: Apr. 26, 2012

(86) PCT No.: PCT/IB2012/001185
§ 371 (c)(1),
(2), (4) Date: Oct. 20, 2014

(87) PCT Pub. No.: WO2013/160715
PCT Pub. Date: Oct. 31, 2013

(65) Prior Publication Data
US 2015/0082017 A1    Mar. 19, 2015

(51) Int. Cl.
*G06F 1/24* (2006.01)
*G06F 11/36* (2006.01)
*G06F 1/26* (2006.01)

(52) U.S. Cl.
CPC .................. *G06F 1/24* (2013.01); *G06F 1/26* (2013.01); *G06F 11/3656* (2013.01)

(58) Field of Classification Search
CPC ........... G06F 1/24; G06F 1/26; G06F 11/3656

USPC ......................................................... 713/100
See application file for complete search history.

(56) References Cited

U.S. PATENT DOCUMENTS

| 5,557,236 | A | 9/1996 | Monti |
| 6,026,469 | A | 2/2000 | Hoang et al. |
| 6,499,123 | B1 | 12/2002 | McFarland et al. |
| 6,738,834 | B1* | 5/2004 | Williams ............ G06F 13/4072 710/10 |
| 2001/0033198 | A1 | 10/2001 | Lee et al. |
| 2002/0060676 | A1 | 5/2002 | Kim |
| 2006/0152246 | A1* | 7/2006 | Tucker ............... H03K 19/1731 326/38 |
| 2007/0090848 | A1* | 4/2007 | Tumin ............... G01R 31/3172 324/762.02 |
| 2010/0011202 | A1* | 1/2010 | Murawski ............. G06F 9/441 713/2 |
| 2010/0162796 | A1 | 7/2010 | Shadwick |

(Continued)

OTHER PUBLICATIONS

International Search Report and Written Opinion correlating to PCT/IB2012/001185 dated Dec. 26, 2012.

*Primary Examiner* — Thomas Lee
*Assistant Examiner* — Aaron J Browne (57) ABSTRACT

An electronic device having a pin for setting its mode of operation, wherein the pin is connected or connectable to a first connection of a resistor, wherein the electronic device is arranged to detect a location of the resistor, wherein the electronic device is arranged to detect a size of the resistor, wherein the electronic device is arranged to determine a first setting based on the location of the resistor, and wherein the electronic device is arranged to determine a second setting based on the size of the resistor.

20 Claims, 4 Drawing Sheets

(56) References Cited

U.S. PATENT DOCUMENTS

2011/0173424 A1* 7/2011 Claudet .................... G06F 1/32
713/1

* cited by examiner

ELECTRONIC DEVICE HAVING A PIN FOR SETTING ITS MODE OF OPERATION AND METHOD TO SET A MODE OF OPERATION FOR AN ELECTRONIC DEVICE HAVING A PIN

FIELD OF THE INVENTION

This invention relates to an electronic device having a pin for setting its mode of operation and a method to set a mode of operation for an electronic device having a pin.

BACKGROUND OF THE INVENTION

Electronic devices, for example, a processing unit for executing a sequence of logical operations, are widespread. It is desired to use similar electronic devices with different applications to reduce the provided overall number of different electronic devices. For this purpose, it is necessary to adapt the electronic device to the different applications by setting its mode of operation. Setting the mode of operation may comprise the adaption of the electronic device to different periphery devices and/or periphery device configurations that may be connected to the electronic device, for example.

The setting of the mode of operation may be based on the previous detection of an intended mode of operation for the electronic device. When the setting of the mode of operation is completed, the electronic device is configured. It is useful to realize the setting of the mode of operation in hardware so that it is software independent, guarantees a known default state, and complies with safe requirements.

Common electronic devices usually comprise a plurality of pins that provide an electrical interconnection between the electronic devices and the periphery devices. In order to adapt an electronic device to different periphery devices and/or different periphery device configurations, it is known to detect a size of an external resistor connected to one of the plurality of pins.

In addition, it may be desired to use the configured electronic device in a debug mode for development purposes. In order to control the activation of the debug mode of a configured or unconfigured electronic device, it is known to use a pin that is different from the pin used for configuration. However, the cost of the electronic device increases with the total pin number.

In order to reduce the total pin number, the U.S. Pat. No. 5,557,236 describes the alternate use of a single pin as an input pin and an output pin. U.S. Pat. No. 6,499,123 describes the different use of a single pin depending on its mode of operation.

SUMMARY OF THE INVENTION

The present invention provides an electronic device having a pin for setting its mode of operation and a method to set the mode of operation for an electronic device having a pin as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Although the definition of the terms hereinafter used should not be construed as limiting, the terms as used are understood to comprise at least the following.

In the context of this specification, "electronic device" may be used for any kind of programmable or non-programmable electronic device for executing a sequence of logical operations.

The term "pin" may be used for any single-wire electronic connector.

The term "resistor" may be used for an electronic component having a first connection, a second connection, and a defined ohmic resistance.

The term "size" in connection with the resistor may describe the value of the ohmic resistance of the resistor.

The term "internal" may be used for characterizing anything within or inside the electronic device, for example, within a housing of the electronic device.

The term "external" may be used for characterizing anything outside the electronic device, for example, outside of a housing of the electronic device.

The term "signal" may be used for a specific change of a voltage or current level at a predetermined point of the electronic device.

The term "location" in connection with a resistor may be used to describe electrical connections of the resistor. For example, a first connection of the resistor may be connected to a point A, and a second connection of the resistor may be connected to a point B. This may be referred to as "located between A and B".

Figure 1:
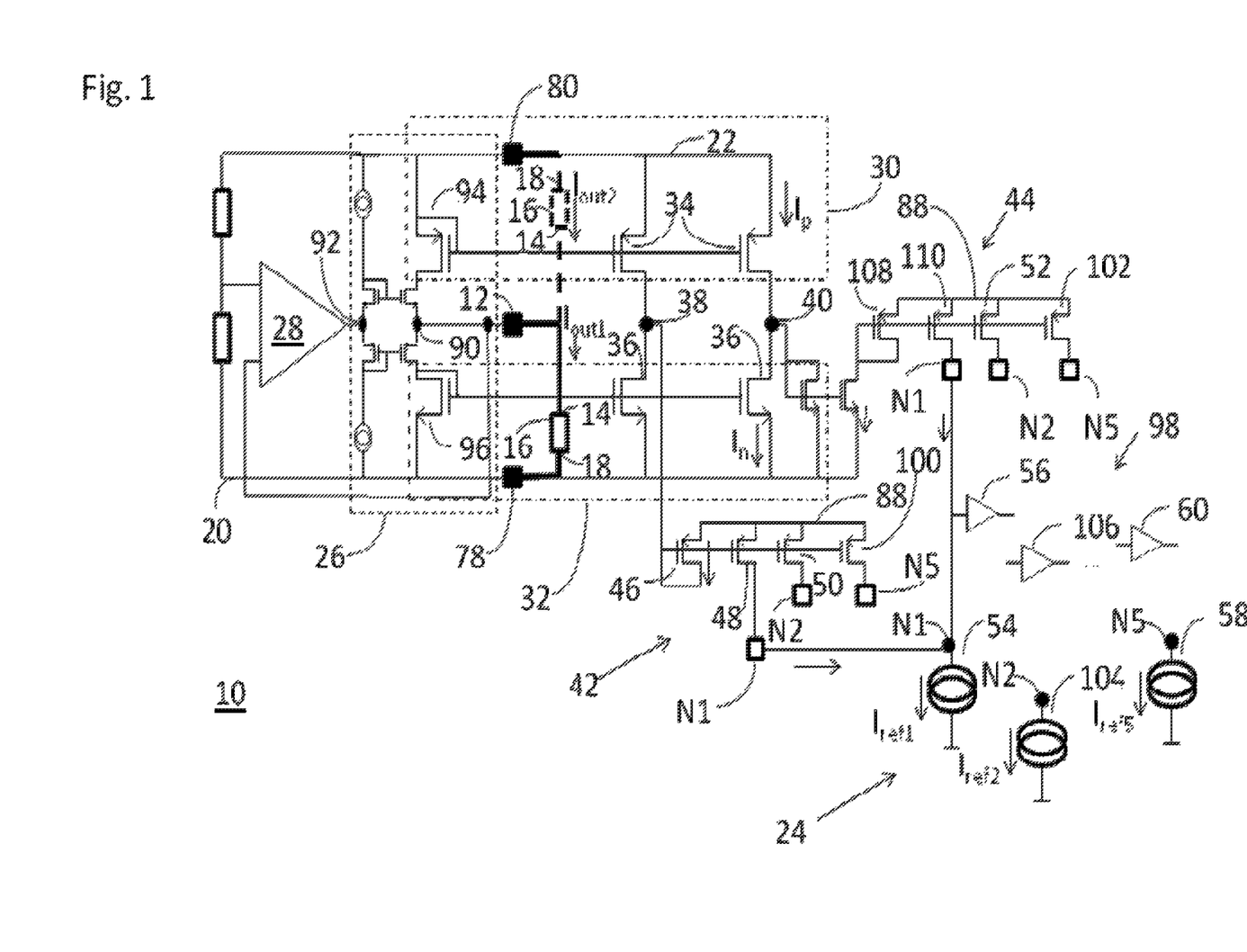
FIG. 1 schematically shows a partial view of a circuit diagram of an exemplary embodiment of an electronic device.

Referring to FIG. 1, the partial view of a circuit diagram of an exemplary embodiment of an electronic device is schematically shown. All components shown in FIG. 1 may be internal components of the electronic device 10 except for an external resistor 16. The external resistor 16 may, for example, be external with respect to the electronic device 10. A pin 12, a ground pin 78, and a voltage supply pin 80 may be internal as well as external components, as they may be used to connect the internal components of the electronic device 10 with external components and may, for example, extend beyond a housing of the electronic device 10. The pin 12 may be used for setting a mode of operation for the electronic device 10.

The pin 12 may be connected to a push-pull stage 26 of the electronic device 10. The push-pull stage 26 may be connected to the ground pin 78 via a ground line 20 and may be connected to the voltage supply pin 80 via a voltage supply line 22. The push-pull stage 26 may comprise a plurality of electronic components for adjusting a voltage that is supplied at the pin 12 as will be explained later. A gain of the push-pull stage 26 between a first point 90 and a second point 92 may be, for example, 1. The first point 90 may be connected in parallel to the pin 12 and an input of an amplifier 28, wherein an output of the amplifier 28 may be connected to the second point 92. An exemplary layout for the push-pull stage 26 may be seen from FIG. 1.

The voltage supply line 22 may be used to provide a voltage supply for electronic components of the electronic device 10. The voltage supply line 22 may be, for example, connected to an external voltage supply via the voltage supply pin 80. Similarly, electronic components of the electronic device may be grounded via a ground line 20, wherein the ground line 20 may be, for example, connected to an external ground via the ground pin 78.

The external resistor 16 having a first connection 14 and second connection 18 may close a connection between the pin 12 and the ground line 20 or between the pin 12 and the voltage supply line 22. For example, the pin 12 may be connected or connectable to the first connection 14 of the external resistor 16, and the second connection 18 of the external resistor 16 may be connected or connectable either to the ground pin 78 or to the voltage supply pin 80. The electronic device 10 may detect a location of the external resistor 16. The electronic device 10 may determine a first setting based on the detected location. For example, the first connection 14 may be connected to the pin 12, and the second connection 18 may be connected to the ground pin 78 or to the voltage supply pin 80, such that the external resistor 16 may be located between the pin 12 and the ground pin 78 or between the pin 12 and the voltage supply pin 80.

The two possibilities for the connection of the resistor are both shown in FIG. 1. For example, the connection between the pin 12 and the ground pin 78 via the external resistor 16 may be shown as a bold solid line. The alternative connection between the external resistor 16 and the voltage supply pin 80 may be shown as a bold dashed line. At any time, only one of the connections may be realized.

The electronic device 10 may detect the size of the external resistor 16. The electronic device 10 may determine a second setting based on the size of the external resistor 16. When the external resistor 16 is connected between the pin 12 and the ground pin 78, a first external current $I_{out1}$ may flow between the pin 12 and the ground line 20. When the external resistor 16 is connected between the pin 12 and the voltage supply line 22, a second external current $I_{out2}$ may flow between the voltage supply line 22 and the pin 12. It should be understood that the second external current $I_{out2}$ may vanish when the first external current $I_{out1}$ flows and that the first external current $I_{out1}$ may vanish when the second external current $I_{out2}$ flows.

The electronic device 10 may comprise an $I_p$ sense circuit 30 and an $I_n$ sense circuit 32. The $I_p$ sense circuit 30 may partly overlap with the push-pull stage 26. A sensed first internal current $I_p$ may flow through a reference p-mosfet 94. The sensed first internal current $I_p$ may be identified as an internal current flow between the voltage supply pin 80 and the pin 12. The $I_p$ sense circuit 30 may be, for example, a p-mos current mirror that clones the sensed first internal current $I_p$ for measurement purposes. For this purpose, the $I_p$ sense circuit 30 may comprise a plurality of p-mosfets 34, wherein all gates of the plurality of p-mosfets 34 may be connected to a gate of the reference p-mosfet 94.

Similarly, the $I_n$ sense circuit may partly overlap with the push-pull stage 26. A sensed second internal current $I_n$ may flow through a reference n-mosfet 96. The sensed second internal current $I_n$ may be identified with as an internal current flow between the pin 12 and the ground pin 78. The $I_n$ sense circuit 32 may be, for example, a n-mos current mirror that clones the sensed second internal current $I_n$ for measurement purposes. For this purpose, the $I_n$ sense circuit 32 may comprise a plurality of n-mosfets 36, wherein all gates of the plurality of n-mosfets 36 may be connected to a gate of the reference n-mosfet 96.

The $I_p$ sense circuit 30 and the $I_n$ sense circuit 32 may be interconnected at a first node 38 and a second node 40. The difference between the sensed first internal current $I_p$ and the sensed second internal current $I_n$ may be tapped at the first node 38 and the second node 40. When the resistor 16 is connected to the pin 12 and the ground pin 78, the first external current $I_{out1}$ may be identified as the difference between the sensed first internal current $I_p$ and the sensed second internal current $I_n$, i.e., $I_{out1}=I_p-I_n$. As previously mentioned, the second external current $I_{out2}$ may vanish in this case. On the other hand, when the resistor 16 is connected between the voltage supply pin 80 and the pin 12, the sensed second internal current may be identified as the difference between the sensed second internal current $I_n$ and the sensed first internal current $I_p$, i.e., $I_{out2}=I_n-I_p$. Again, as previously mentioned, the first external current $I_{out1}$ may vanish in this case. It should be understood that the absolute values of the first external current $I_{out1}$ that may be measured when the resistor 16 connects the pin 12 to the ground pin 78 and the second external current $I_{out2}$ that may be measured when the resistor 16 connects the voltage supply pin 80 to the pin 12 may be identical. When the external resistor 16 is connected to the pin 12 and the ground pin 78, the sensed first internal current $I_p$ may be much larger than the sensed second internal current $I_n$, and the first external current $I_{out1}$ may be positive. When the external resistor 16 is connected to the voltage supply pin 80 and the pin 12, the sensed second internal current $I_n$ may be much larger than the sensed first internal current $I_p$, and the second external current $I_{out2}$ may be positive. It should be understood that by detecting the sign of the difference between the sensed first internal current $I_p$ and the sensed second internal current $I_n$, for example, the sign of $I_p-I_n$ or the sign of $I_n-I_p$, the location of the external resistor 16 may be detected. When the first connection 14 of the external resistor 16 is connected to the pin 12, the location of the external resistor 16 may be defined by the point of connection of the second connection 18 of the external resistor 16. In other words, the electronic device 10 may detect the point of connection of a second connection 18 of the resistor 16 based on the sensed first internal current $I_p$ and the sensed second internal current $I_n$. For example, this may be realized by detecting the sign of $I_p-I_n$ or $I_n-I_p$. The sign of $I_n-I_p$ may be detected, for example, at the first node 38 or the second node 40. The electronic device may generate a first signal for the first setting based on the sign of the difference between the sensed first internal current $I_p$ and the sensed second internal current $I_n$. For example, the first signal may be generated by using a simple comparator that is not shown in FIG. 1. This comparator may for example transform a negative current into a logical "1" and a positive current into a logical "0" as an output signal. The output signal of the comparator may be used as an input signal for a control circuit of the electronic device 10 that may control the first setting. The first setting may be related to a debug mode. When the first signal is "1", the electronic device 10 may switch to the debug mode. When the first signal is "0", the electronic device 10 may switch to "normal" mode.

The current that may be tapped at the first node 38 may be supplied with a first detection line 42. Similarly, the current that may be tapped at the second node 40 may be supplied with a second detection line 44. The first detection line 42 may be used, for example, to detect a value of the second external current $I_{out2}$, and the second detection line 44 may be used, for example, to detect a value of the first external current $I_{out1}$. The electronic device 10 may generate a second signal for the second setting based on an absolute value of a difference between the sensed first internal current $I_p$ and the sensed second internal current $I_n$. As mentioned previously, the first external current $I_{out1}=I_p-I_n$ and the second external current $I_{out2}=I_n-I_p$ may always have positive values and may represent the absolute value of the difference between the sensed first internal current $I_p$ and the sensed second internal current $I_n$. The electronic device 10 may detect the absolute value of the difference between the sensed first internal current $I_p$ and the sensed second internal current $I_n$ by a comparison with at least one reference current source. An exemplary realisation of the detection will be explained in the following.

The first detection line 42 may comprise a first detection line transdiode 46 and a plurality of p-mosfets. The first detection line transdiode 46 may be, for example, a p-mosfet having its gate connected to its own source. The plurality of p-mosfets may comprise, for example, a first first detection line p-mosfet 48, a second first detection line p-mosfet 50, and a fifth first detection line p-mosfet 100. Gates of the first detection line transdiode 46, the first first detection line p-mosfet 48, the second first detection line p-mosfet 50, and the fifth first detection line p-mosfet 100 may be connected to the first node 38. Drains of the first detection line transdiode 46, the first first detection line p-mosfet 48, the second first detection line p-mosfet 50, and the fifth first detection line p-mosfet 100 may be connected to a detection voltage supply line 88. The first detection line 42 may function as a current mirror that clones the second external current $I_{out2}$. The second external current $I_{out2}$ may be provided at all nodes N1, N2, ..., and N5. Each of the nodes N1, N2, ..., N5 may be connected to one of plurality of reference current sources 24. For example, the node N1 may be connected to a first reference current source 54. Similarly, the second node N2 may be connected to a second reference current source 104, and the fifth node N5 may be connected to a fifth reference current source 58. In other words, each node N1, N2, ..., N5 may be connected to a different reference current source of the plurality of current sources 24. Each of the nodes N1, N2, ..., N5 may be connected to one of a plurality of inverters 98. For example, a first inverter 56 may be connected to the first node N1. Similarly, a second inverter 106 may be connected to the second node N2, and a fifth inverter 60 may be connected to the fifth node N5. Each inverter of the plurality of inverters 98 may transform a vanishing input signal into a non-vanishing output signal and a non-vanishing input signal into a vanishing output signal. In other words, each inverter may transform a logical "0" into a logical "1" and a logical "1" into a logical "0". Each of the plurality of reference sources 24 may provide a different reference current. For example, the first reference current source 54 may provide a first reference current $I_{ref1}$, the second reference current source 104 may provide a first reference current $I_{ref2}$, and the fifth reference current source 58 may provide a fifth reference current $I_{ref5}$. For example, the first reference current $I_{ref1}$ may be smaller than the second reference current $I_{ref2}$, the second reference current $I_{ref2}$ may be smaller than a third reference current $I_{ref3}$, and so on, such that the fifth reference current $I_{ref5}$ is the largest of the provided reference currents.

The second detection line 44 may comprise a second detection line transdiode 108 and a plurality of p-mosfets. The second detection line transdiode 108 may be, for example, a p-mosfet having its gate connected to its own source. The plurality of p-mosfets may comprise, for example, a first second detection line p-mosfet 110, a second second detection line p-mosfet 52, and a fifth second detection line p-mosfet 102. Gates of the second detection line transdiode 108, the first second detection line p-mosfet 110, the second second detection line p-mosfet 52 and the fifth second detection line p-mosfet 102 may be connected to the second node 40. Drains of the second detection line transdiode 108, the first second detection line p-mosfet 108, the second second detection line p-mosfet 52, and the fifth second detection line p-mosfet 102 may be connected to the detection voltage supply line 88. The second detection line 44 may function as a current mirror that clones the first external current $I_{out1}$. The first external current $I_{out1}$ may be provided at all nodes N1, N2, ..., and N5. Each of the nodes N1, N2, ..., N5 may be connected to one of the plurality of reference current sources 24. For example, the node N1 may be connected to the first reference current source 54. Similarly, the second node N2 may be connected to the second reference current source 104, and the fifth node N5 may be connected to the fifth reference current source 58. In other words, each node N1, N2, ..., N5 may be connected to a different reference current source of the plurality of current sources 24. Each of the nodes N1, N2, ..., N5 may be connected to one of the plurality of inverters 98. For example, the first inverter 56 may be connected to the first node N1. Similarly, the second inverter 106 may be connected to the second node N2, and the fifth inverter 60 may be connected to the fifth node N5.

As is shown in FIG. 1, each node N1, N2, ..., N5 may be simultaneously connected to the first detecting line 42, the second detecting line 44, one of the plurality of inverters 98, and one of the plurality of reference current sources 24. For example, the first node N1 may be connected to the first first detection line p-mosfet 48, the first second line p-mosfet 110, the first inverter 56, and the first reference current 54. It should be understood that the number of nodes, the number of first detection line p-mosfets, the number of second detection line p-mosfets, the number of reference currents, and the number of inverters may be equal. A different number may be possible, for example, larger or smaller than 5. A different number may allow, for example, a different grading for the detection of the size of the external resistor 16.

The first detection line 42 may be used to detect the second external current $I_{out2}$, and the second detection line 44 may be used to detect the first external current $I_{out1}$. As previously mentioned, the second external current $I_{out2}$ may vanish when the first external current $I_{out1}$ has a non-vanishing value. When the first external current $I_{out1}$ vanishes, the second detection line 44 may not provide any current at the nodes N1, N2 ..., N5. In this case, the different reference currents provided by the plurality of reference current sources 24 may be compared with the second external current $I_{out2}$ at the plurality of inverters 98.

For example, the second external current $I_{out2}$ may be compared with the first reference current $I_{ref1}$ at the first inverter 56, the second external current $I_{out2}$ may be compared with the second external current $I_{ref2}$ at the second inverter 106, and the second external current $I_{out2}$ may be compared with the fifth reference current $I_{ref5}$ at the fifth inverter 60. As previously mentioned, the equation $I_{ref1}<I_{ref2}<I_{ref3}<I_{ref4}<I_{ref5}$ may be assumed, for example.

When the second external current $I_{out2}$ is larger than the first reference current $I_{ref1}$, the input signal of the first inverter 56 may be non-vanishing, and the output signal of the first inverter 56 may be "0". When the second external current $I_{out2}$ is larger than the second reference current $I_{ref2}$, the input signal of the second inverter 106 may be non-vanishing, and the output signal of the second inverter 106 may be "0". When the second external current $I_{out2}$ is larger than the third reference current $I_{ref3}$, the input signal of the third inverter may be non-vanishing, and the output signal of the third inverter may be "0". When the second external current $I_{out2}$ is larger than the fourth reference current $I_{ref3}$, the input signal of the forth inverter may be non-vanishing, and the output signal of the forth inverter may be "0". When the second external current $I_{out2}$ is smaller than the fifth reference current $I_{ref5}$, the input signal of the fifth inverter 60 may be vanishing, and the output signal of the fifth inverter 60 may be "1". The value of the second external current $I_{out2}$ may directly depend on the size of the external resistor 16. It may be possible to detect the size of the external resistor 16 by detecting the value of the second external current $I_{out2}$. It should be understood that this detection of the second external current $I_{out1}$ may mean that it is larger than $I_{ref4}$ and smaller than $I_{ref5}$ ($I_{ref5}<I_{out2}<I_{ref5}$). The dependence between the second external current $I_{out2}$ and the size of the external resistor 16 may lead to the relationship $R_{ref4}<R_{external\ resistor}<R_{ref5}$, wherein $R_{ref4}$ may be the size of a resistor that corresponds to $I_{ref4}$, and wherein $R_{ref5}$ may be the size of a resistor that corresponds to $I_{ref5}$. The grading of the detection may be adapted, for example, by changing the number of inverters and the number of different reference current sources for shrinking the regions between two reference current values of adjacent different reference current sources. The output signal of the plurality of inverters 98 may be the second signal. The output signal of the plurality of inverters 98 may have different values, wherein the number of different values may relate to the number of the plurality of inverters 98.

As mentioned previously, the second detection line 44 may be used to detect the value of the first external current $I_{out1}$ that may be defined as $I_{out1}=I_p-I_n$. Due to the different definitions of the first external current $I_{out1}$ and the second external current $I_{out2}$, there may be additional n-mosfets in the connection between the second node 40 and the second detection line 44. These additional n-mosfets may function as a current mirror similar to the $I_p$ sense circuit 30 for changing the sign of the current tapped at the second node 40.

As previously mentioned, the first external current $I_{out1}$ may vanish when the second external current $I_{out2}$ has a non-vanishing value. When the second external current $I_{out2}$ vanishes, the first detection line 42 may not provide any current at the nodes N1, N2, . . . , N5. In this case, the different reference currents provided by the plurality of reference current sources 24 may be compared with the first external current $I_{out1}$ at the plurality of inverters 98. The detection process may be similar to the detection process for the value of the second external current $I_{out2}$. It should be understood that the resulting second signal provided by the plurality of the inverters 98 is independent from the first signal based on the location of the external resistor 16, and it may not change when the external resistor 16 changes its location.

Figure 2:
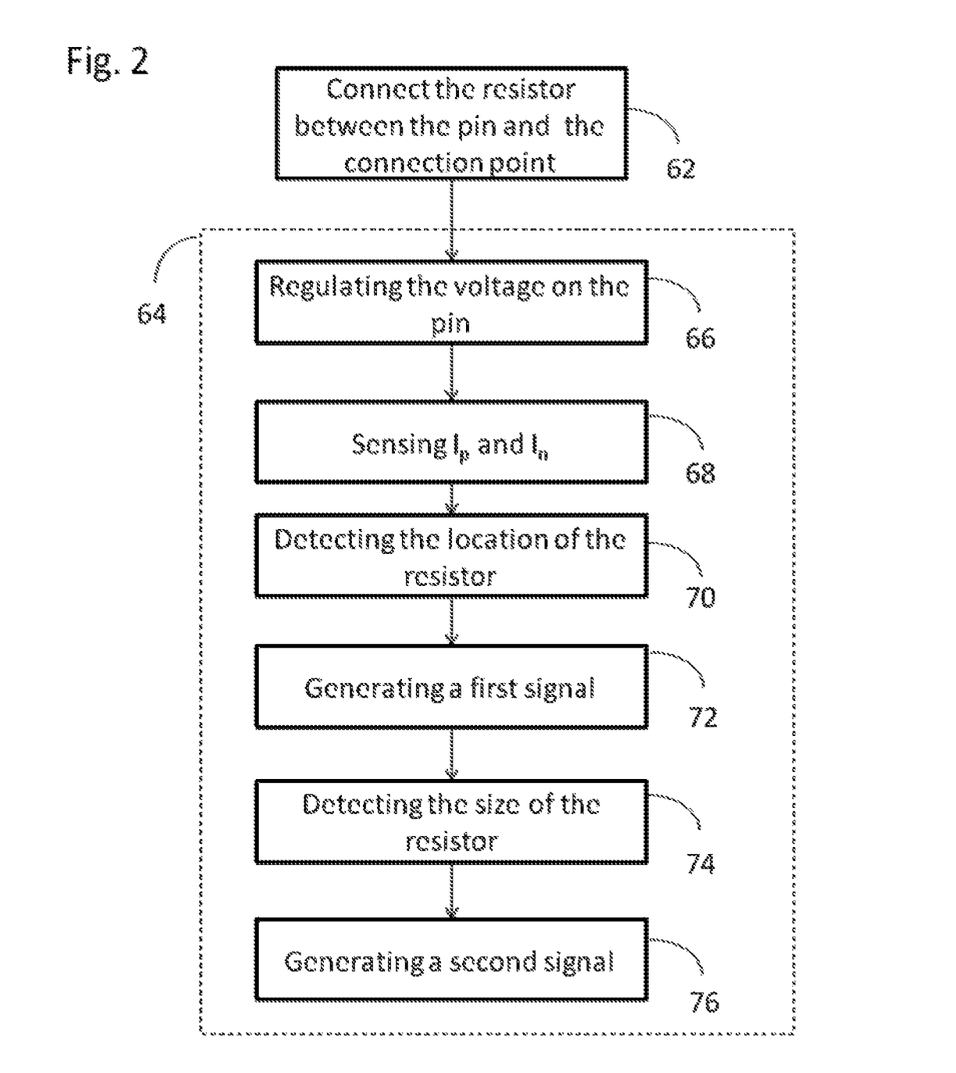
FIG. 2 schematically shows a flow diagram of an exemplary embodiment of the electronic device.

Referring now to FIG. 2, a flow diagram of an exemplary embodiment of the electronic device is schematically shown. When the resistor is connected between the pin and the further connection point that may be, for example, the ground pin or the voltage supply pin in step 62, the method 64 may start. The method 64 may comprise the following steps: regulating the voltage on the pin in step 66, sensing the first internal current $I_p$ and the second internal current $I_n$ in step 68, detecting the location of the resistor in step 70, generating a first signal in step 72, detecting the value of the resistor in step 74, and generating a second signal in step 76. Most of the steps of the method 64 have been described previously in connection with FIG. 1. The step 72 for generating a first signal may comprise the determining of a first setting. The step 76 for generating a second signal may comprise the determining of a second setting.

Regulating the voltage on the pin may be realized automatically. For example, the amplifier and the push-pull stage that are known from FIG. 1 may automatically adapt the voltage provided at the pin based on the size and the location of resistor.

Sensing the first internal current $I_p$ and the second internal current $I_n$ in step 68 may be easily realized.

Detecting the connection point in step 70 may be realized, for example, based on a difference between the first internal current $I_p$ and the second internal current $I_n$, i.e., $I_p-I_n$ or $I_p-I_n$, that may be tapped directly at the first node 38 or the second node 40.

Generating a first signal in step 72 may be realized, for example, with a simple analogue comparator as mentioned in connection with FIG. 1.

The detection of a size of the resistor in step 74 may be realized based on the first detection line and the second detection line that have been already described in connection with FIG. 1.

Generating a second signal in step 76 may be realized based on the inverters already mentioned in connection with FIG. 1.

The first signal and the second signal may be used for setting the mode of the operation of the electronic device. The first signal and the second signal may be independent of each other. For example, the first signal may be used to switch between a debug mode and a normal mode of the electronic device. In the debug mode, a watchdog that may be implemented in the electronic device may be disabled for testing purposes. It should be understood that the first signal may be used for any other configuration of the electronic device that may be clearly indicated by a simple "on/off" signal. The second signal may carry more information depending on the grading for the detection of the size of the resistor. The second signal may be used for hardware configuration, for example, detecting the periphery that may be connected to the electronic device, determining operating frequencies of the electronic device, regulating voltages provided by the electronic device, activating or deactivating specific parts of the electronic device, and changing the power management behavior of the electronic device.

This method and the electronic device described herein may be used to reduce the total pin number of the electronic device. Two independent signals for configuration purposes may be simultaneously gathered at a single pin, i.e., the pin 12.

Figure 3:
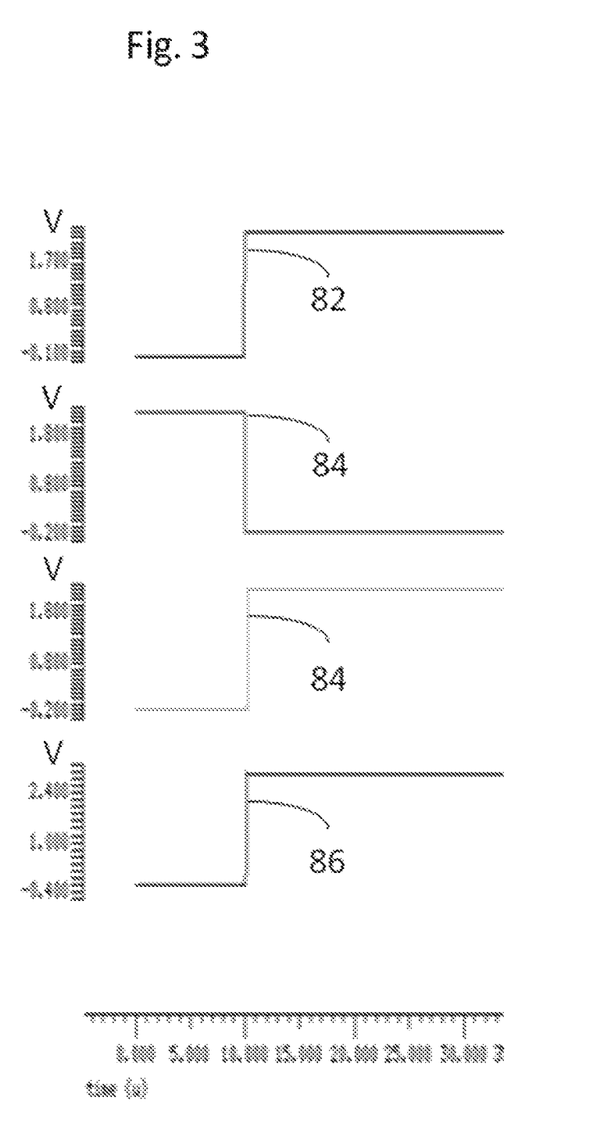
FIG. 3 schematically shows voltage curves that can be measured at an embodiment of the electronic device, as functions of time.

Referring now to FIG. 3, exemplary voltages that may be measured at an embodiment of the electronic device as functions of time are schematically shown. A first voltage curve 82 represents the external supply voltage at the voltage supply line. At the time T=10 seconds, the electronic device may be switched on by providing a supply voltage.

The second voltage curve 84 may represent the first signal that may be used based on the difference between the sensed first internal current $I_p$ and the sensed second internal current $I_n$. For example, in FIG. 3, the pin may be connected to the ground pin via the external resistor. As shown in FIG. 3, the first signal has a defined value. In this example, the second voltage curve 84 that may represent the first signal changes its state at the time T=10 seconds. The new value of the second voltage curve 84 may indicate a "0" or the normal mode.

The third voltage curve 86 may correspond to the output signal of one of the inverters known from FIG. 1. The exact value of the third voltage curve 86 may depend on the inverter and may be not really important.

The fourth voltage curve 86 may show the voltage at the pin of the electronic device, for example, the push-pull stage known from FIG. 1 may provide an adapted voltage based on the size and the location of the resistor.

Figure 4:
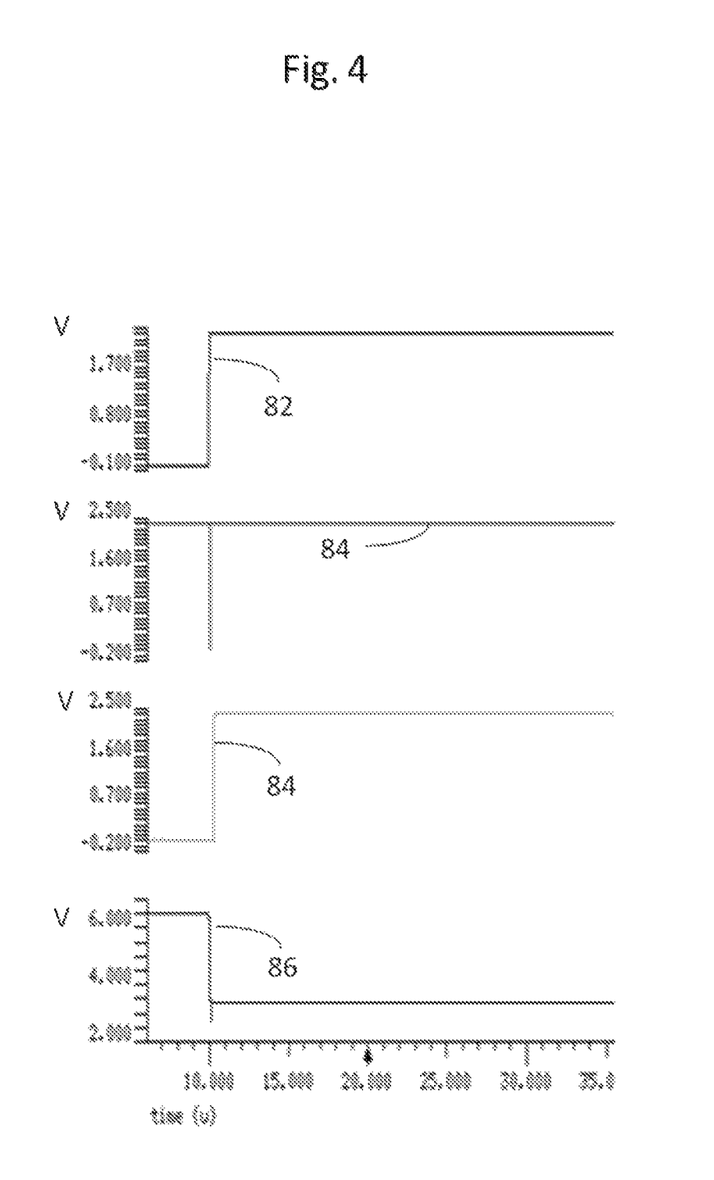
FIG. 4 schematically shows further voltage curves that can be measured at an embodiment of the electronic device as functions of time.

Referring now to FIG. 4, further exemplary voltages that may be measured at an embodiment of the electronic device as function of time are schematically shown. The voltage curves may represent the same variables as in FIG. 3. However, FIG. 4 may show the situation when the pin is connected to the voltage supply line via the resistor. Similarly to FIG. 3, the first voltage curve 82 may represent the supplied voltage and may indicate the activation of the electronic device at a time T=10 seconds. Again, as in FIG. 3, the second voltage curve 84 may have a constant value when the electronic device is activated. As can be seen in FIG. 4, the first signal may change from "0" or normal mode as shown in FIG. 3 to "1" or debug mode.

The third voltage curve 84 may be identical to the third voltage curve shown in FIG. 3. This may prove that the generation of the first signal and the generation of the second signal do not interfere with each other.

The fourth voltage curve 86 may show the voltage provided by the push-pull stage known from FIG. 1 at the pin.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the push-pull stage shown in FIG. 1, the $I_p$ sense circuit, the $I_n$ sense circuit, the first detection line, and the second detection line may be implemented in different forms that are well known to those skilled in the art.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated examples may be implemented as circuitry located on a single integrated circuit or within a same device. For example, the electronic device may be a programmable or non-programmable processing unit for executing a sequence of logical operations, wherein the processing unit may be implemented as a single chip. Alternatively, the examples may be implemented as any number of separate integrated circuits or separate devices interconnected with each other in a suitable manner. For example, at least one of the push-pull stage, the $I_p$ sensing circuit, the $I_n$ sensing circuit, the first detection line, the second detection line, the plurality of inverters, and the plurality of reference current sources may be implemented as a separate component or chip that may be connected to the remaining components of the electronic device via a printed circuit board.

Also, for example, the examples or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An electronic device having a pin for setting its mode of operation, the electronic device comprising:
   a push-pull stage including a first transistor having a first current electrode coupled to the pin and a second current electrode coupled to a first reference voltage and a second transistor having a first current electrode coupled to the pin and a second current electrode coupled to a second reference voltage, the push-pull stage configured to adjust a voltage provided at the pin;
   a first current mirror including a third transistor, a control electrode of the third transistor coupled to a control electrode of the first transistor, the first current mirror to clone a current conducted at the first transistor; and
   a second current mirror including a fourth transistor, a control electrode of the fourth transistor coupled to a control electrode of the second transistor, the second current mirror to clone a current conducted at the second transistor,
   wherein the pin is connected to a first terminal of a resistor,
   wherein the electronic device is arranged to detect a location of the resistor, the location identifying connectivity of a second terminal of the resistor,
   wherein the electronic device is arranged to detect a size of the resistor based on a current provided by the first current mirror and a current provided by the second current mirror,
   wherein the electronic device is arranged to determine a first setting based on the location of the resistor, and
   wherein the electronic device is arranged to determine a second setting based on the size of the resistor.

2. The electronic device as claimed in claim 1,
   wherein the electronic device is arranged to detect the location of the resistor based on a sensed first internal current and a sensed second internal current,
   wherein the sensed first internal current flows between a voltage supply pin of the electronic device and the pin, and wherein the sensed second internal current flows concurrent with the first internal current between the pin and a ground pin of the electronic device.

3. The electronic device as claimed in claim 2, wherein the electronic device is arranged to generate a first signal for the first setting based on a sign of a difference between the sensed first internal current and the sensed second internal current.

4. The electronic device as claimed in claim 2, wherein the electronic device is arranged to generate a second signal for the second setting based on an absolute value of a difference between the sensed first internal current and the sensed second internal current.

5. The electronic device as claimed in claim 4, wherein the electronic device is arranged to detect the absolute value of the difference between the sensed first internal current and the sensed second internal current In by a comparison with at least one reference current source.

6. The electronic device as claimed in claim 1, wherein the first setting is related to a debug mode.

7. The electronic device as claimed in claim 1, wherein the second setting is related to a hardware configuration.

8. A method to set a mode of operation for an electronic device having a pin connected to a first terminal of a resistor, the method comprising:
   generating a first current conducted between a first current electrode and a second current electrode of a first transistor of a push pull circuit, the first current electrode coupled to the pin and a second current electrode coupled to a first reference voltage;
   generating a second current conducted between a first current electrode and a second current electrode of a second transistor of the push pull circuit, the second transistor having a first current electrode coupled to the pin and a second current electrode coupled to a second reference voltage, the push-pull stage configured to adjust a voltage provided at the pin;
   cloning the first current at a first current mirror, the first current mirror including a third transistor, a control electrode of the third transistor coupled to a control electrode of the first transistor; and
   cloning the second current at a second current mirror, the second current mirror including a fourth transistor, a control electrode of the fourth transistor coupled to a control electrode of the second transistor;
   wherein the electronic device detects a location of the resistor, the location identifying connectivity of a second terminal of the resistor,
   wherein the electronic device detects a size of the resistor based on the cloned first current and the cloned second current,
   wherein the electronic device determines a first setting based on the location of the resistor, and
   wherein the electronic device determines a second setting based on the size of the resistor.

9. The method as claimed in claim 8,
   wherein the electronic device detects the location of the resistor based on a sensed first internal current and a sensed second internal current,
   wherein the sensed first internal current flows between a voltage supply pin and the pin, and wherein the sensed second internal current flows between the pin and a ground pin.

10. The method as claimed in claim 9, wherein the electronic device generates a first signal for the first setting based on the sign of a difference between the sensed first internal current and the sensed second internal current.

11. The method as claimed in claim 9, wherein the electronic device generates a second signal for the second setting based on an absolute value of a difference between the sensed first internal current and the sensed second internal current.

12. The method as claimed in claim 11, wherein the electronic device detects the absolute value of the difference between the sensed first internal current and the sensed second internal current by a comparison with at least one reference current source.

13. The method as claimed in claim 8, wherein the first setting is related to a debug mode.

14. The method according to claim 8, wherein the second setting is related to a hardware configuration.

15. An electronic device having a pin for setting its mode of operation, the electronic device comprising:
   wherein the pin is connected to a first terminal of a resistor,
   wherein the electronic device is arranged to detect a location of the resistor, the location identifying connectivity of a second terminal of the resistor,
   wherein the electronic device is arranged to detect a size of the resistor,
   wherein the electronic device is arranged to determine a first setting based on the location of the resistor,
   wherein the electronic device is arranged to determine a second setting based on the size of the resistor,
   wherein the electronic device is arranged to detect the location of the resistor based on a sensed first internal current and a sensed second internal current,
   wherein the sensed first internal current flows between a voltage supply pin of the electronic device and the pin, and wherein the sensed second internal current flows concurrent with the first internal current between the pin and a ground pin of the electronic device.

16. The electronic device as claimed in claim 15, wherein the electronic device is arranged to generate a first signal for the first setting based on a sign of a difference between the sensed first internal current and the sensed second internal current.

17. The electronic device as claimed in claim 15, wherein the electronic device is arranged to generate a second signal for the second setting based on an absolute value of a difference between the sensed first internal current and the sensed second internal current.

18. The electronic device as claimed in claim 17, wherein the electronic device is arranged to detect the absolute value of the difference between the sensed first internal current and the sensed second internal current In by a comparison with at least one reference current source.

19. The electronic device as claimed in claim 15, wherein the first setting is related to a debug mode.

20. The electronic device as claimed in claim 1, wherein the second setting is related to a hardware configuration.

* * * * *